United States Patent
Phillips

(10) Patent No.: US 7,441,661 B2
(45) Date of Patent: *Oct. 28, 2008

(54) SOLIDS/LIQUIDS SEPARATOR

(75) Inventor: Donald Ian Phillips, Heathmont (AU)

(73) Assignee: Water Solutions (Aust) Pty Ltd., Victoria (AU)

( * ) Notice: Subject to any disclaimer, the term of this patent is extended or adjusted under 35 U.S.C. 154(b) by 517 days.

This patent is subject to a terminal disclaimer.

(21) Appl. No.: 11/053,606

(22) Filed: Feb. 8, 2005

(65) Prior Publication Data

US 2005/0167344 A1  Aug. 4, 2005

Related U.S. Application Data

(63) Continuation of application No. 10/276,278, filed as application No. PCT/AU01/00543 on May 11, 2001, now Pat. No. 6,868,971.

(30) Foreign Application Priority Data

May 12, 2000  (AU)  ................... PQ7466

(51) Int. Cl.
B03B 5/60 (2006.01)

(52) U.S. Cl. .................. 209/156; 209/274; 209/370; 210/154; 210/170.03

(58) Field of Classification Search ............ 209/17, 209/156, 219, 259, 273, 370, 906, 274; 210/154–156, 210/164, 170.03, 299

See application file for complete search history.

(56) References Cited

U.S. PATENT DOCUMENTS

| | | | |
|---|---|---|---|
| 3,891,548 A | 6/1975 | Marcussen |
| 4,476,021 A | 10/1984 | Souza |
| 4,689,145 A | 8/1987 | Mathews et al. |
| 5,770,057 A | 6/1998 | Fillon |
| 5,788,848 A | 8/1998 | Blanche et al. |
| 6,086,756 A | 7/2000 | Roy |

FOREIGN PATENT DOCUMENTS

| | | |
|---|---|---|
| WO | WO 94/16159 | 7/1994 |
| WO | WO 97/05338 | 2/1997 |
| WO | WO 97/31162 | 8/1997 |
| WO | WO 99/45214 | 9/1999 |
| WO | WO 99/54564 | 10/1999 |
| WO | WO 99/66141 | 12/1999 |

Primary Examiner—Joseph C Rodriguez
(74) Attorney, Agent, or Firm—Ballard Spahr Andrews & Ingersoll, LLP

(57) ABSTRACT

A separator for separating solids and other objects (debris) from a liquid, and having a separator body (2) through which the liquid, having debris entrained therein (16, 19, 20), flows from an inlet (6) to an outlet (13), and a port (5) for diverting flow from the outlet during moderate flows whereby the debris entrained in the liquid is removed. A floor (11) wherein the separator is raised to form a hump (43) adjacent to or in which the opening (5) is located.

16 Claims, 8 Drawing Sheets

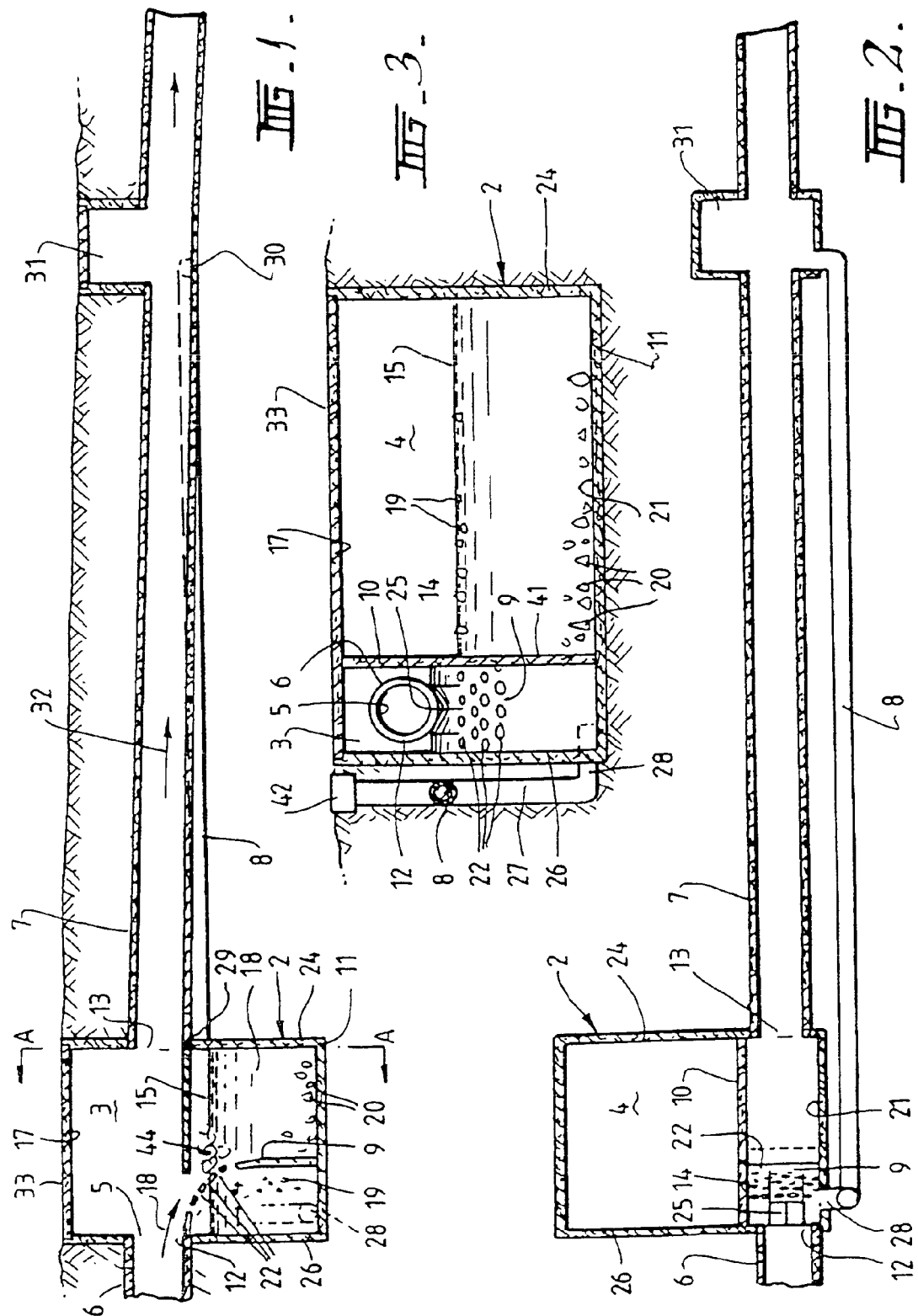

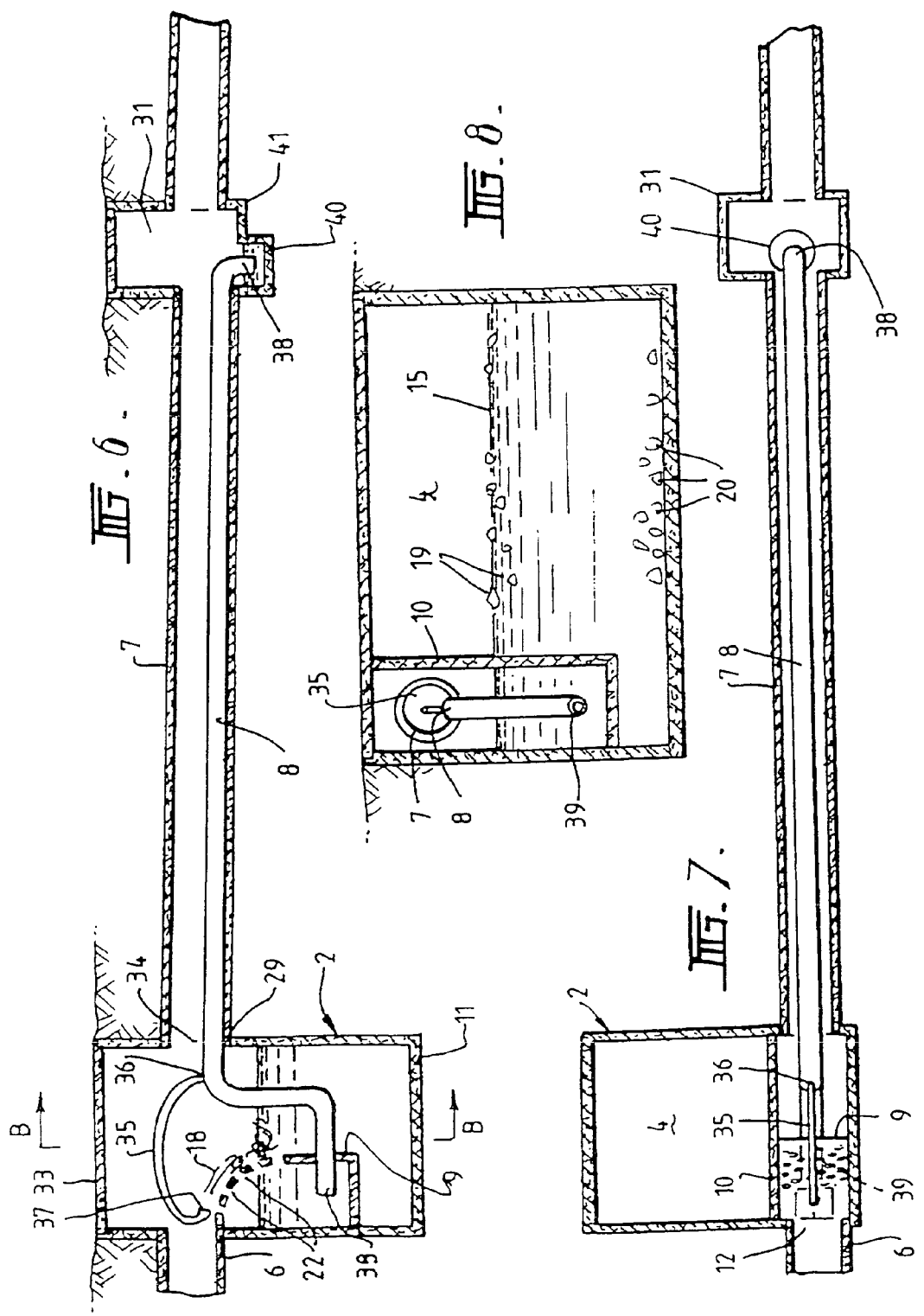

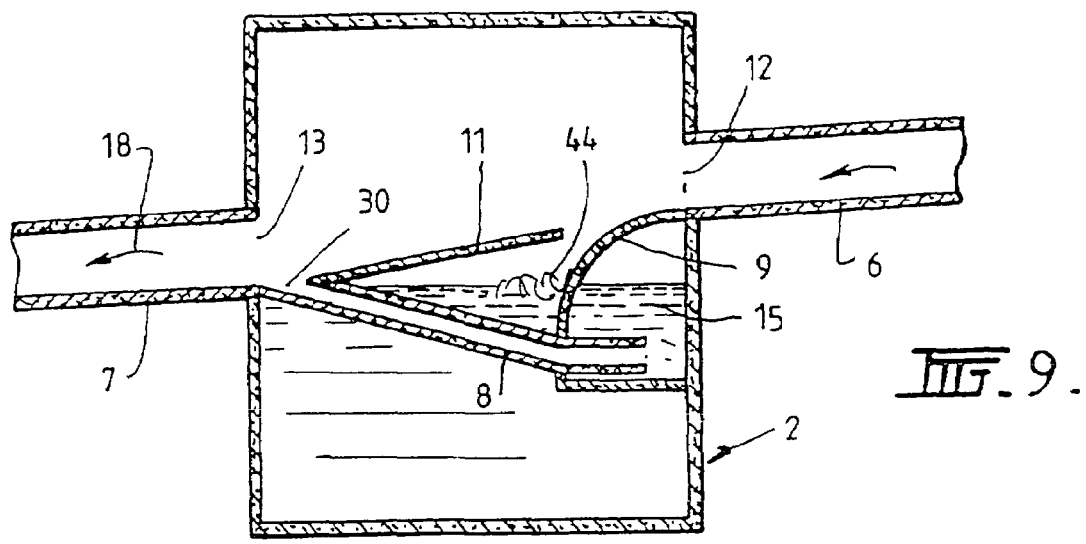
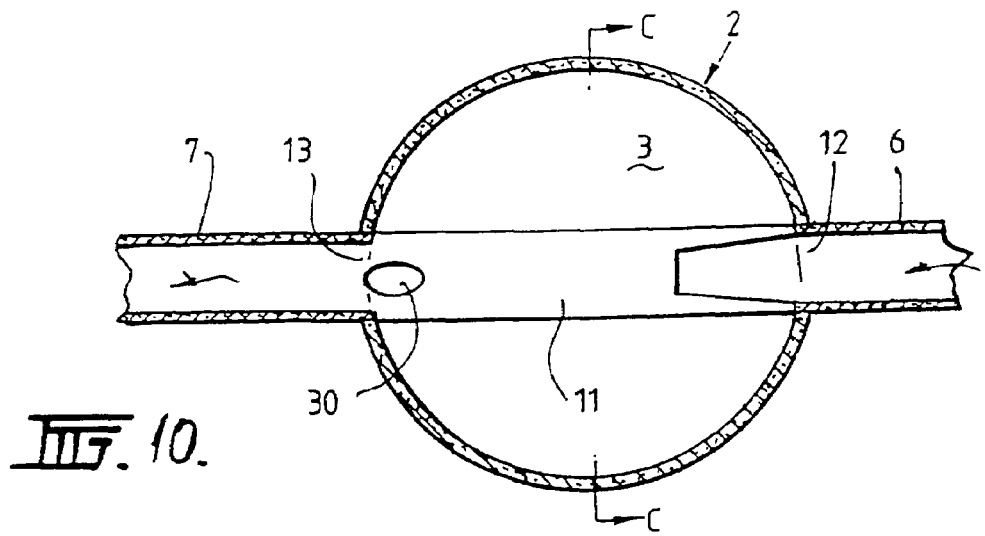
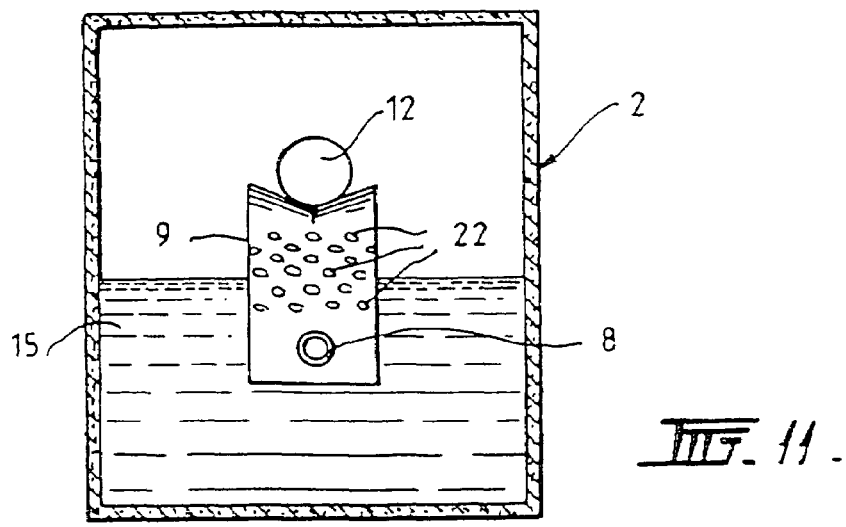

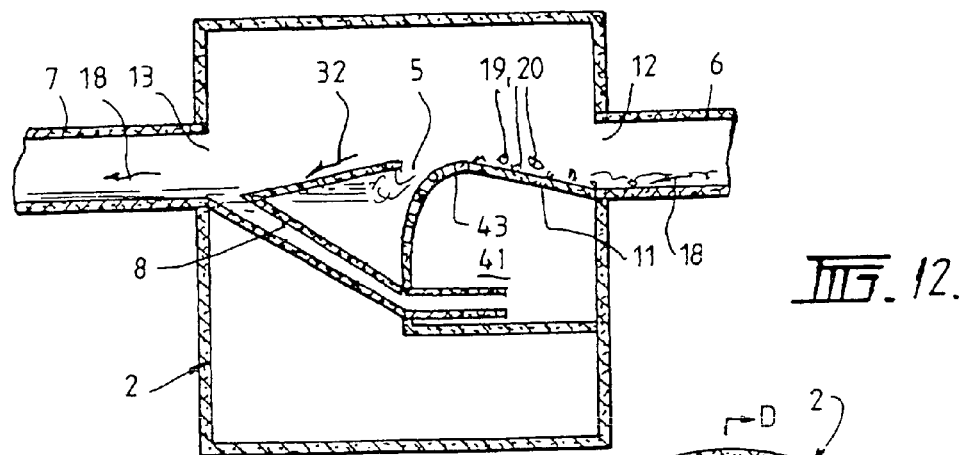
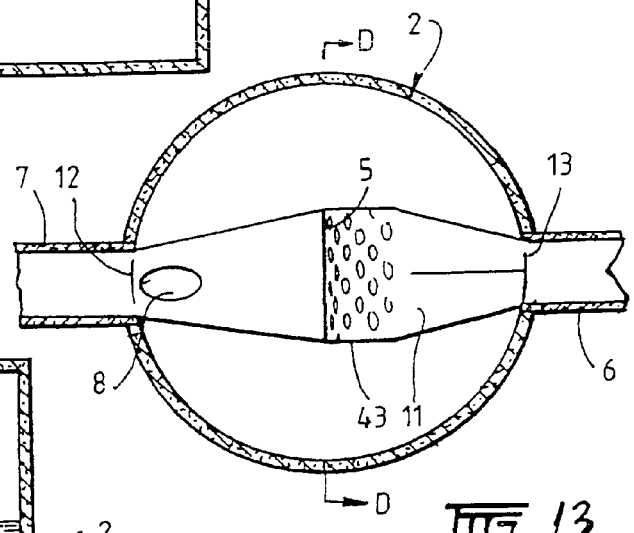
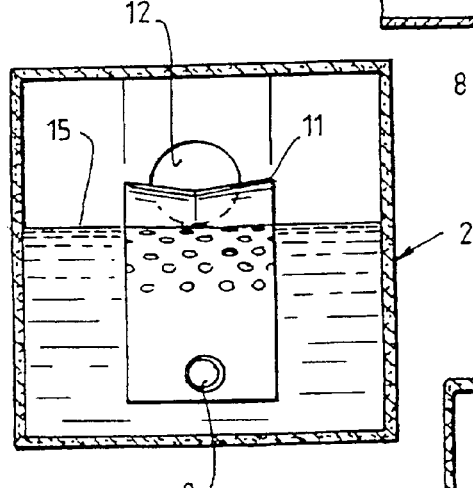
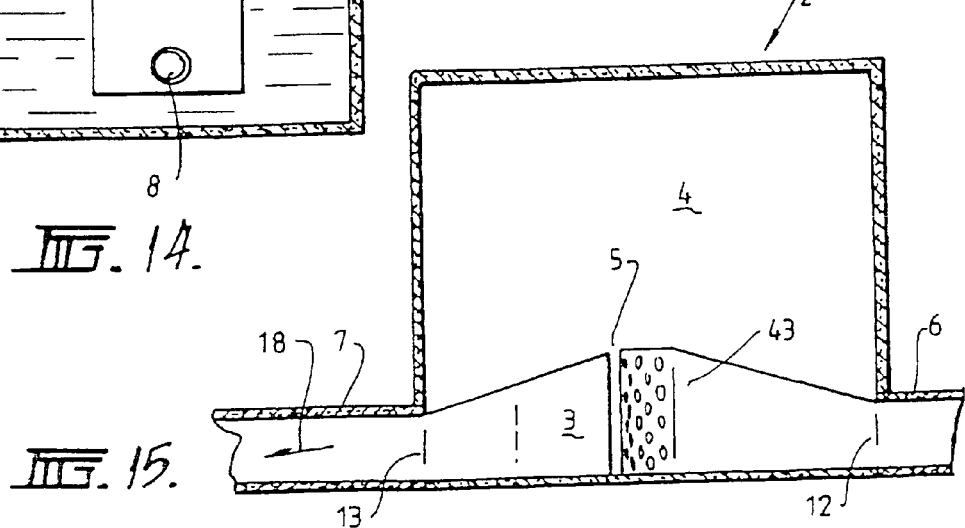

SOLIDS/LIQUIDS SEPARATOR

CROSS REFERENCE TO RELATED APPLICATIONS

This application is a continuation of application Ser. No. 10/276,278, filed Nov. 12, 2002, and issued as U.S. Pat. No. 6,868,971 on Mar. 22, 2005, which is the National Stage of International Application No. PCT/AU01/00543, filed May 11, 2001, which claims priority to Australian Application No. PQ 74666, filed May 12, 2000. The aforementioned applications are hereby incorporated herein by reference in their entirety.

TECHNICAL FIELD

This invention relates to a solids/liquid separator, and more particularly the invention relates to a separator for separating pollutant solids and other objects (debris) from a liquid, such as in a stormwater drainage system. Such separators are also known as pollutant traps, and any reference to a solids/liquid separator, also includes pollutant traps.

BACKGROUND ART

In stormwater drainage systems, it is desirable to remove debris from the storm water before it is discharged into rivers, lakes, bays and the like. Floating debris can be a particular problem because it accumulates on the banks of rivers and shores of bays while heavier debris sinks to the bed smothering aquatic life and causing siltation.

Consequently these materials can badly degrade the environment. Unfortunately, due to sociological problems such debris now includes syringes which obviously represent a further public health risk problem. It is desirable therefore to try to remove debris from stormwater and this is usually accomplished by means of separator or pollutant traps that basically attempt to trap debris from stormwater by use of meshes, grates or the like. Unless these are specially configured they tend to clog up, thereby reducing their effectiveness. Another problem in removing debris from stormwater is that energy is lost from the flow and manifests itself as raised water levels upstream of the trap with possible local flooding. Present pollutant traps use walls and the like across the pipeline as a means of diverting the flow into the separator. As these obstruct the pipeline they can cause backing up during high flows raising upstream water levels and causing local flooding. If they are not regularly cleaned out, as is often the case, the accumulations of debris and litter can build up and block the pipeline with similar results.

An object of the invention is to provide a separator that largely overcomes the problems noted above. The separator of the invention may find application in other areas where it is necessary to separate debris from liquids such as in sewage systems, trade waste treatment or town water supplies.

DISCLOSURE OF THE INVENTION

According to the present invention there is provided a separator for separating solids and other objects from a liquid, said separator having a separator body through which the liquid, having debris entrained therein, flows from an inlet to an outlet, and means for diverting flow from the outlet during moderate flows whereby the solids and other objects entrained in the liquid is removed, and wherein the means for diverting the flow is an opening in the separator and has adjacent thereto a wall containing a plurality of apertures therethrough.

Preferably the separator is for separating both floating and heavier bodies from the flow.

Preferably the opening is in an internal floor of the separator.

Preferably the separator body includes an upstream conduit portion and a first chamber the floor of which is level with the bottom of the said conduit. The opening noted above is located in this floor. In an alternative arrangement of the invention, portion of the said floor is raised to form a hump adjacent to which the said opening is located.

Preferably the separator includes a second chamber located either laterally to, or on both sides of, the first chamber and also extending beneath it, there being said opening and apertured wall between the first and second chambers through which the liquid, together with the entrained debris is diverted.

Preferably the liquid level in the second chamber is kept below the floor level of the first chamber by means of a secondary conduit connected to the second chamber and to the conduit at a downstream point being at a lower level than the upstream conduit portion.

In two of the alternative arrangements described hereinafter, the secondary conduit is contained within the second chamber.

Preferably the above-mentioned opening has two sides extending down to that portion of the apertured wall immediately below the opening.

Preferably the second chamber contains the perforated wall interposed between the flow and the secondary conduit for deflecting the solids and other objects from the flow.

Preferably the floor of the second chamber is located below that of the first chamber so as to provide a holding area for heavier solids and other objects.

Flow into the second chamber takes place through the above mentioned opening although if this exceeds the capacity of the secondary conduit, portion of the liquid will flow over the opening and leave the separator through the downstream conduit portion connected to the first chamber. This conduit may be at the same, or in an alternative arrangement of the invention, at a lower level than the upstream conduit portion.

BRIEF DESCRIPTION OF THE DRAWINGS

A number of preferred embodiments of the invention will now be described with reference to the accompanying drawings, in which:

FIG. 1 is a schematic longitudinal cross-sectional side elevational view of a first embodiment of the separator of the invention, FIG. 2 is a schematic cross-sectional plan view of the separator of FIG. 1 of the drawings, FIG. 3 is a cross-sectional side view taken along line A-A of FIG. 1, FIG. 6 is a schematic longitudinal cross-sectional side elevational view of a second embodiment of the separator of the invention, FIG. 7 is a schematic cross-sectional plan view of the separator of FIG. 6 with some constructional features omitted for the sake of clarity, FIG. 8 is a cross-sectional view taken along line B-B of FIG. 6, FIG. 9 is a schematic longitudinal cross-sectional side elevational view of a third preferred embodiment of the invention, FIG. 10 is a schematic cross-sectional plan view of the separator of FIG. 9 of the drawings, FIG. 11 is a cross-sectional view taken along line C-C of FIG. 10 of the drawings, FIG. 12 is a schematic longitudinal cross-sectional side elevational view of a fourth preferred embodiment of the invention, FIG. 13 is a schematic cross-sectional plan view of the separator of FIG. 12, FIG. 14 is a cross-sectional view taken along line D-D of FIG. 13, FIG. 15 is a schematic cross-sectional plan view of a modified version of the embodiment of FIGS. 12 to 14.

BEST MODES OF CARRYING OUT THE INVENTION

Figure 4:
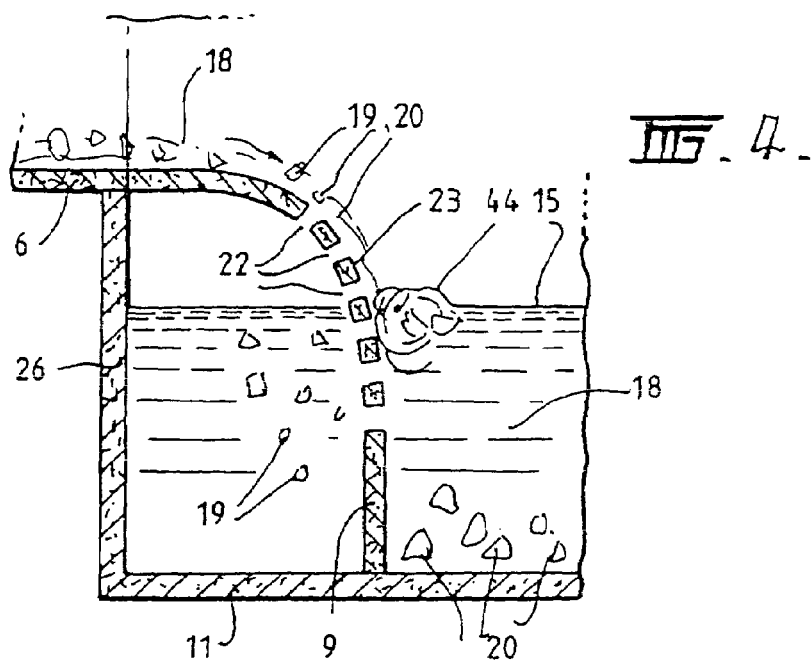
FIG. 4 is an enlarged view of portion of the separator of FIG. 1.

The separator in FIGS. 1 to 4 is constructed to remove debris, such as solids and other objects, from storm water drainage pipes. The separator includes a separator body 2 containing a diversion chamber 3 and separator/holding chamber 4 which can also capture oils, tars and other scum. Fluid thereafter flows through an opening 5 with downward projecting sides 14 and an apertured (perforated) curved wall 9, as best seen in FIG. 4, and firstly through an inlet conduit 6, and thereinafter through an outlet conduit 7 and secondary outlet conduit assembly 8.

The separator body 2 is preferably cast from concrete although the body may also be formed from materials other than concrete.

The conduits 6 and 7 are typically already in service and the overall length of the separator is the same as the nominal length of pipes in a stormwater drain (typically 2.4 m). In this way the separator of the invention may be retrofitted in a stormwater drain by removing one of the pipes and replacing it with the separator of the invention.

Diversion chamber 3 is separated from separator/holding chamber 4 by a wall 10 that extends from the top of the separator 17 to a floor 11, by floor 11 and by common walls 24 and 26. This is best seen in FIGS. 1 and 2. The diversion chamber 3 includes an inlet port 12 and an outlet port 13 that provide liquid communication with the conduits 6 and 7. The diversion chamber 3 also includes an opening 5 located in the upstream section of the floor 11 and provides liquid communication with separator/holding chamber 4. The opening 5 has sides 14 that project down to perforated wall 9 and so direct liquid 18 into separator/holding chamber 4. This is best seen in FIGS. 1 and 3. The purpose of sides 14 are to retain floating bodies 16 in separator/holding chamber 4 on water surface 15, after they have been propelled through the opening 5 and down perforated wall 9 by the force of the incoming liquid 18 entering inlet port 12 from conduit 6.

Heavier bodies 19, 20 are propelled down the perforated wall 9 by the liquid 18. A non-perforated V-shaped central section 25 of the wall 9 extending downwards to static water level 15 prevents heavier bodies 20 from lodging in the openings 22 of the perforated wall. This is best seen in FIG. 3. The heavy bodies 20 move transversely to separator/holding chamber 4, settling out on the floor 21 from where they can later be removed by pumping.

In the present preferred arrangement, the curved perforated wall 9 extends the width of the separator/holding chamber 3 and is enclosed by the walls 26 and a wall 41, as well as the floor 21 beneath as seen in FIG. 3. Experience may indicate other orientations, positions and openings of the wall.

In the preferred arrangement, the openings 22 through the curved perforated wall 9 over the face 23 of which liquid 18 containing debris 19 and 20, passes are best seen in FIG. 4. The openings 22 allow the liquid 18 and solids 19, being smaller than the openings 22 to pass while the bodies 20 larger than the openings 22 move down the face 23 of the wall 9 and onto the floor 21 of the separator for later removal, such as by pumping. In moving down face 23, bodies 20 also abrade the face and will tend to dislodge any adhering material.

The orientation of the openings 22 and the violent agitation in what is known as "hydraulic jump" indicated as 44, and caused by the impact of rapidly flowing liquid 18 on liquid surface 15 adjacent to the face 23 of the perforated wall, will tend to dislodge floating bodies 16 and heavier bodies 20 and move them away from the face 23 of the wall and into the adjacent section of chamber 4 so that the wall is self-cleaning and the perforations therethrough do not become obstructed by the build-up of solids. The greater the flow in conduit 6, the higher the velocity of liquid 18 and hence the agitation and self cleaning effects on perforated wall 9 at liquid level 15. This, as referred to previously, is technically known as a "hydraulic jump" and occurs when rapid flow is caused to change to tranquil flow with violent agitation and consequent loss of energy. The liquid 18 passes through the perforations 22 in the wall and flows to the secondary conduit 8 via a vertical pipe 27 that has its inlet 28 at the floor 21 so that solids 19 can be scoured by the liquid 18. The top of the pipe 27 is open and located above the level of conduit 6 to facilitate inspection and cleaning. A removable cap 42 seals the top of the pipe.

Secondary conduit 8 has its upstream invert 29 below the level of the floor 11, as can be seen in FIG. 1. Typically this distance is at least 200 mm. As will be seen from the figure the invert level 29 of secondary conduit 8 determines the static level of liquid level 15.

Secondary conduit 8 is generally parallel to conduit 7 but laid at a flat grade so that on reaching a junction pit 31 the inverts of both pipes are at the same level 30. Stormwater drainage pipes have typical grades of between 1 in 60 to 1 in 100 so that a drop of 200 mm from the invert of inlet 12 to the static liquid level 15 would require the length of the secondary conduit 8 to be of 12 and 20 metres respectively.

The diameter of secondary conduit 8 is related to but less than that of conduit 7, typically ranging from 100 mm to 300 mm. Situations may arise where larger sizes are needed. For example, where conduit 7 is of large diameter or to obtain a higher treatment efficiency, as described below.

When the separator is installed within a drainage system, junction pit 31 may be an existing pit. If the separator is near the downstream end of a system discharging stormwater to an open water body, the downstream end of secondary conduit 8 may terminate at a head-wall.

The separator has lids 33 enclosing its top 17 to prevent unauthorised entry and/or to prevent odours or insect breeding. The lids 33 may be removed for inspection, maintenance and cleaning purposes.

When the flow 18 increases to such a rate as to equal the capacity flow-rate of secondary conduit 8, the liquid level 15 rises in chamber 3 to the level of floor 11. During flows greater than the capacity flow-rate of secondary conduit 8 the liquid level 15 rises above the level of floor 11 and the excess liquid 32 passes through outlet 13 and down conduit 7 to junction pit 31 and beyond. When excess liquid flow 32 occurs in conduit 7 the depths of flow in the separator and junction pit 31 will be similar in accordance with the principles of pipe flow. Hence the difference in depths between the two said locations remains similar ensuring that the flow in secondary conduit 8 also is kept relatively constant. Hence excessive flow through opening 5 that could cause undesirable agitation, with possible loss of trapped solid bodies in separator/holding chamber 4 through opening 5, is avoided.

Figure 5:
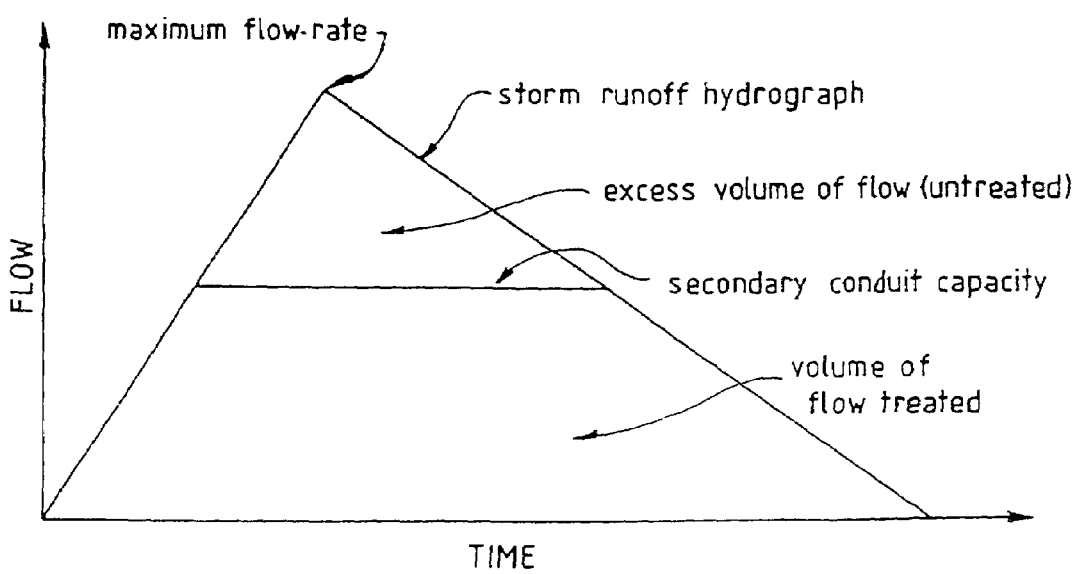
FIG. 5 is a simplified hydrographic analysis of the flow characteristics of the preferred embodiments of the invention.

The passage of stormwater runoff in a pipeline can be graphically represented to facilitate understanding and analysis. One method is shown in FIG. 5 in which a simple triangular shape represents the change in flow-rate past a point with time and is known as a flood hydrograph. The area under the triangular hydrograph represents the volume of flood runoff while the apex of the triangle represents the maximum flow-rate. It will be seen that as a storm progresses, the flow-rate of water through the separator increases to a maximum and then slowly recedes. If the flow capacity of the secondary conduit 8 is represented by the horizontal line drawn through the hydrograph, then the area below the line represents the volume of stormwater that is treated and then passes down conduit 8, while the area above the line represents the excess volume that passes over opening 5 and down conduit 7 and so is not treated. This method provides an acceptably accurate estimate of the volume of flow treated. It can be adjusted to meet water authority specifications by changing the capacity of secondary conduit 8 by varying either its' diameter, slope or length or any combination of these three factors.

In a similar manner, the size of the openings 22 in perforated wall 9 can be chosen to prevent a specified minimum size of heavier solid 20 from passing through the wall and so be retained in separator/holding chamber 4.

In a second alternative embodiment of the invention, seen in FIGS. 6, 7 and 8, the secondary conduit 8 is laid inside conduit 7 between separator 2 and downstream pit 31 and so obviates the need to excavate a trench in which to lay secondary conduit 8 as required in the first embodiment. As shown in FIG. 6, in this embodiment the conduit 8 functions as a siphon as its obvert 34 is now above the upstream invert 29 of conduit 7.

For secondary conduit 8 to siphon liquid from chamber 4, all trapped air must be first removed from it. This is achieved by air bleed line 35 connected to secondary conduit 8 at high point 36 and to a fixed nozzle 37 at inlet port 12. The nozzle is aligned in the direction of incoming flow 18.

The downstream end of secondary conduit 8 terminates in vertical bend 38 extending into a hole 40 excavated below floor 41 of pit 31. This hole is filled with liquid from low flows in conduit 7 and so seals off end 38, preventing air from entering secondary conduit 8 at this location.

When flow occurs in conduit 6, the velocity of the falling liquid 18 scavenges air from nozzle 37 which in turn draws air from the secondary conduit 8 via the air bleed line 35. This process removes all air from the secondary conduit 8 and flow commences under the siphonic action with liquid being drawn into the conduit at end 39 in chamber 4, beneath perforated wall 9 and discharges through end 38 in downstream pit 31. The flow capacity of conduit 7 is only slightly reduced by locating secondary conduit 8 within it as both conduits contribute to carrying the total flow.

In a third alternative embodiment of the invention seen in FIGS. 9, 10 and 11, the secondary conduit terminates within the body 2 with its invert 30 at the same level as the invert of outlet port 13. Floor 11 now slopes from the invert level of inlet port 12 to the invert of outlet port 13 and contains the end of secondary conduit 8. Body 2 is now of circular cross-section and, in FIG. 10, the diversion chamber 3 is shown centrally disposed with respect to the body although the chamber may be disposed to one side of the body.

This embodiment of the separator of the invention could be employed where the conduits 6 and 7 have yet to be laid so that the separator could be first installed and then the conduits 6 and 7 subsequently laid to it. By this means the length of conduit 8 is minimised, so reducing the cost of the installation.

In a fourth embodiment of the invention shown in FIGS. 12, 13 and 14, the floor 11 is raised in its central section to form a hump 43 so that the rapid flowing liquid 18 flows up the hump and drops into opening 5 for treatment. The hump is typically between 200 and 500 mm high with respect to the conduit 6 invert. Secondary conduit 8 is arranged in a similar manner to that in the above third embodiment of the invention.

In this fourth arrangement, opening 5 may be widened in a direction transverse to that of the conduit 6 so that a greater portion of the flow from conduit 6 than in other embodiments of the invention, drops through the opening before the liquid level 15 rises to the top of the opening 5 in hump 43. The diameter of secondary conduit 8 may also be greater in order to carry this flow. When the liquid level 15 rises above floor level 11 in hump 43, excess liquid 32 moves past opening 5 and down hump 43 to pass out of the body 2 through outlet port 13 and into conduit 7.

This arrangement is made possible because flow in pipelines occurs as rapid or super-critical flow, even at quite moderate flow rates. Thus the flow will move up and over hump 43 at high flow rates in super-critical mode. Provided the flow is not induced to change to the sub-critical flow mode by means of "hydraulic jump", no energy loss occurs. This means that no backing up of flow in conduit 6 will occur when the pipe flow is full as it will be in super-critical mode. Therefore the possibility of local flooding upstream is avoided.

However, at low flow rates the liquid 18 will bank up behind the hump 43, which will then act as a weir. While floating bodies 16 may pass over the weir, heavier bodies 19 and 20 will not and may sink to the invert of conduit 6. These bodies 19 and 20 must be periodically removed if obstructions to flow 18 in conduit 6 are to be avoided and this is achieved when super-critical flow occurs.

As flow increases in conduit 6, as occurs during a storm, the flow mode in the conduit changes from sub-critical to super-critical flow at relatively low flow rates. The super-critical, or rapid flow 18, impacts on the banked up water, or tranquil water, forming the "hydraulic jump". As the flow rate increases, the "hydraulic jump" moves downstream towards the hump and the super-critical flow behind it scours the heavier bodies 19 and 20 from the invert of the conduit.

When the flow is sufficiently high, the "hydraulic jump" moves up the hump 43 and the following super-critical flow carries the heavier bodies 19 and 20 up the hump 43 and into opening 5. This arrangement of the invention can be designed so that the required flow occurs with a sufficient frequency to avoid blocking of the conduit 6 with the heavier bodies 19 and 20.

Very low, or "trickle flows", in conduit 6 can pass directly into holding chamber 4 through inclined slots 44 in the side walls of chamber 3 adjacent to the upstream end of hump 43. The slots have their lower ends level with the invert of conduit 6. The slots are cleaned during high flow by the scavenging action of super-critical flow.

An important feature of those embodiments of the present invention that involve the use of a hump is that if the holding chambers 4 become filled with debris, litter and other matter, the flow 18 together with the entrained materials will pass over hump 43 and into outlet port 13 and conduit 7 thus bypassing the separator. Where heavier bodies 20 settle out in conduit 6 they will be removed during periods of super-critical flow over the hump. Consequently there will not be a build-up of materials that could lead to blockage of conduit 6 and the subsequent possibility of upstream flooding.

In a modified form of the fourth embodiment of the invention, as seen in FIG. 15, the mode of operation is essentially the same as in the fourth embodiment but conduits 6 and 7 are now disposed to one side of the separator together with diversion chamber 3. In this modified embodiment the approach and reverse slopes of hump 43 are splayed on one side only and the opening 5 is in liquid communication with holding chamber 4 on the splayed side of the hump only.

This modified embodiment can apply where the pipeline is located behind the kerb line of a street, as is usually the case, and designed to avoid fouling other services that are also located behind the kerb line, and the holding chamber is therefore located under the roadway and this is convenient for inspection and cleaning operations.

The separators of the embodiments of FIGS. 16 to 21 are constructed but not restricted, to removing debris from small storm water drainage pipes, whilst these embodiments can also prove effective in capturing oils, tars and other scum. In these embodiments a circular separator body 100 incorporates a diversion/bypass chamber 102 (first chamber) and separator/holding chamber 103 (second chamber), together with inlet port and conduit 104 and outlet port and conduit 105.

The circular separator body 100 is preferably formed from concrete although, once again, other materials, other than concrete, may be used.

The conduits 104 and 105 are typically already in service and the overall length of the separator is once again the same as the nominal length of pipes in a storm-water drain (typically 2.4 m). In this way the separator of the invention could once again be retrofitted in a storm-water drain by removing one of the pipes and replacing it with the separator of this preferred embodiment of the invention.

Figure 16:
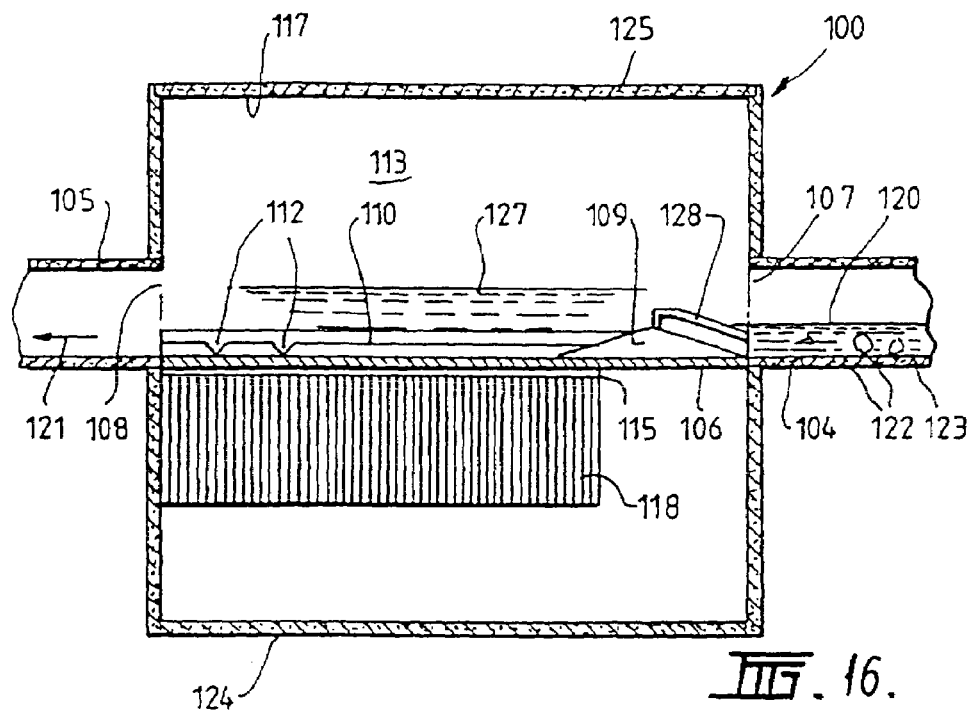
FIG. 16 is a schematic longitudinal cross-sectional side elevational view of a fifth preferred embodiment of the invention.
Figure 17:
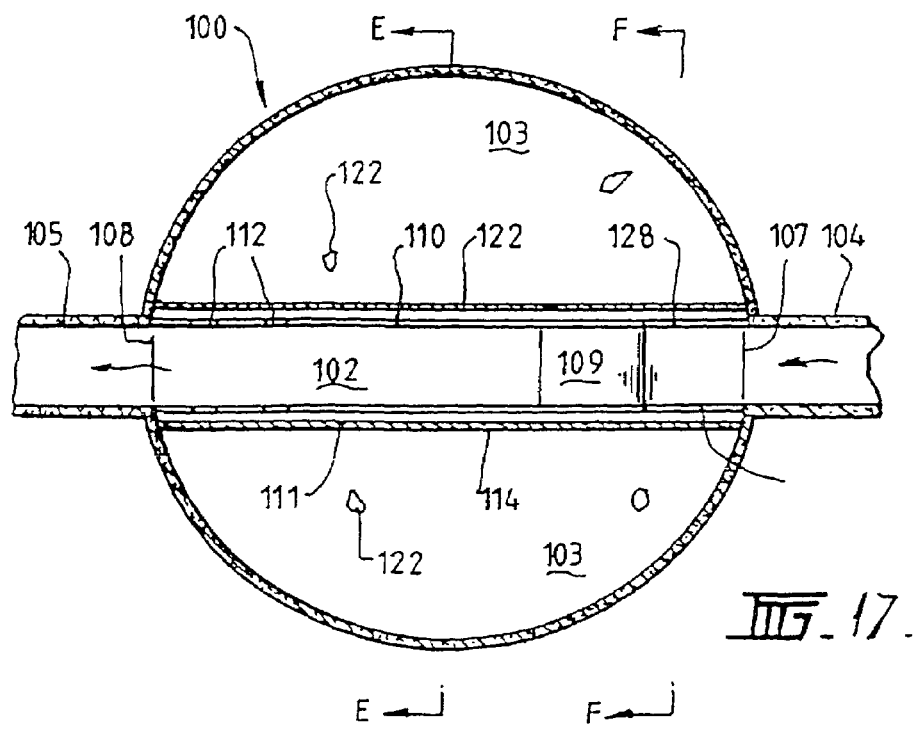
FIG. 17 is a schematic plan view of the separator of FIG. 16.
Figure 18:
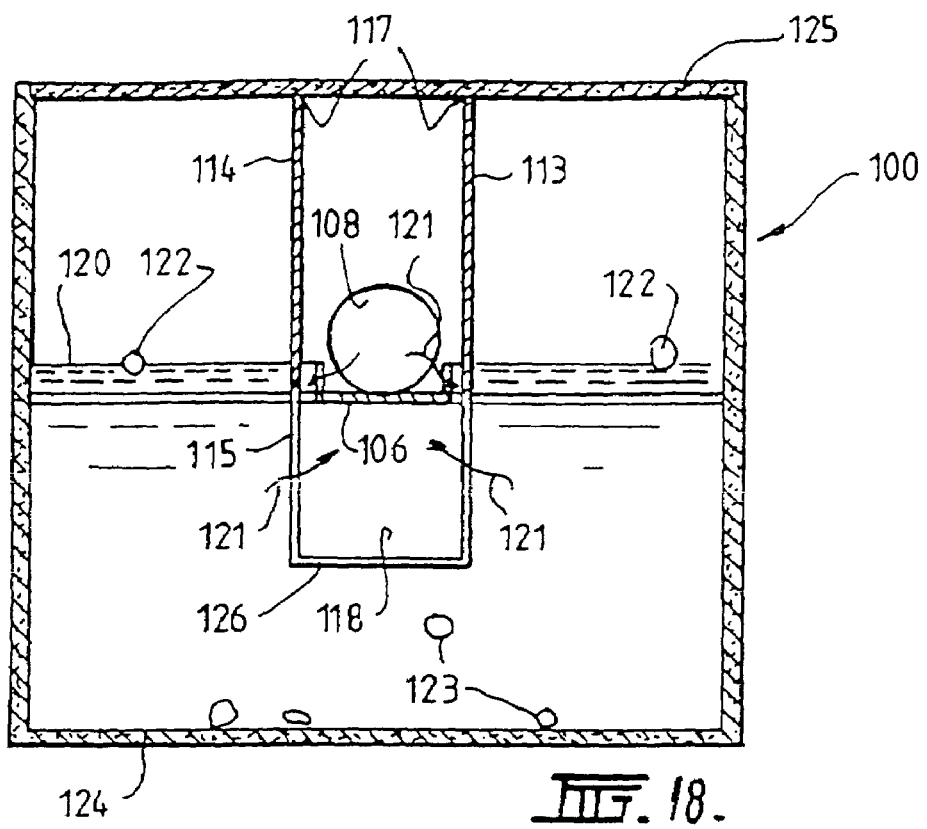
FIG. 18 is a schematic cross-sectional view taken along line E-E of FIG. 17.
Figure 19:
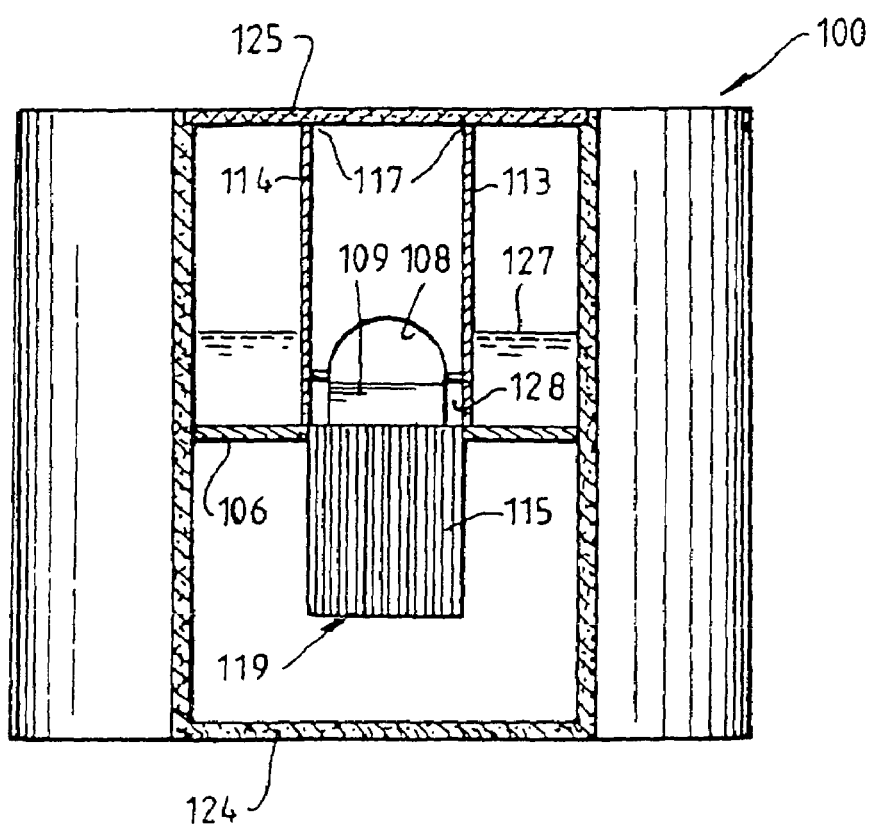
FIG. 19 is a schematic cross-sectional view taken along line F-F of FIG. 17.

Diversion/bypass chamber 102 is enclosed within separator/holding chamber 103 and has its floor 106 at the same level as inverts 107 and 108 of the inlet and outlet conduits respectively. Floor 106 extends the full length of separator body 100. A transverse hump 109 extends the full width of the floor and is located near its upstream end. This is best seen in FIG. 16. Downstream of the hump the floor is bounded on both sides by low return weirs 110 and 111, the crests of which are below the crest of the hump. Several small notches 112 in the weirs extend to floor 106.

Baffle walls 113 and 114 are located immediately behind and parallel to the weirs and extend longitudinally from the ends of the hump to the outlet port and conduit 105. Lower edges 115 of the baffles extend beneath the level of floor 106. Upper edges 117 of the baffles extend to the top of the separator body 100.

Screens of vertical wires 118 are attached to the lower edges 115 and extend beneath floor 106, as best seen in FIG. 16. The spacing of the wires is set to retain a specified size of bodies 123. The ends of the screens beneath hump 109 are connected by screen wall 119 while the downstream ends finish flush with separator body 100. The bottom edges of screen walls 118 and 119 are attached to horizontal screen 126 to form an enclosed cage.

The two principal modes of operation of these preferred embodiments of the invention will be described with reference to the FIGS. 16 to 21.

In the first mode of operation the depth 120 of flow 121 entering diversion/bypass chamber 102 through inlet port 104 is less than that of the height of the hump 109. Consequently flow 121 together with entrained floating bodies 122 and heavy bodies 123 are diverted to either side of floor 106 by the hump into separator/holding chamber 103 via diversion ports 128.

Floating bodies 122 move towards the downstream end of the chamber where they are retained behind baffles 113 and 114.

Within the chamber, heavy bodies 123 tend to settle to floor 124 although the slower settling of these bodies is drawn by flow 121 towards the screen 118. Any of the bodies that reach screen 118 are intercepted by it and settle to the floor of chamber 103.

Flow 121 passes beneath the lower baffle edges 115 and over weirs 110 and 111 to the floor 106 in chamber 102 and exits separator body 100 via outlet port and conduit 105.

The purpose of the weirs is to evenly distribute flow 121 through screen 118 and so reduce its velocity to prevent any of the bodies obstructing the screen. When flow 121 is very small it passes through the notches 112 in the said weirs. This is to ensure that no flow containing bodies 122 and 123 is held in inlet conduit 104 where these could settle and so obstruct the conduit.

The second principal mode of operation occurs when flow 121 passes over hump 109 in a phenomenon known as super-critical flow and practically all of flow 121 bypasses chamber 103. Super-critical flow occurs in all storm-water drainage pipelines once a certain low flow is exceeded.

In the first mode of operation as the flow 121 increases, it banks up as hump 109 diverts it via diversion ports 128, to the chamber 103 for treatment prior to passing over the weirs 110 and 111. Upstream in inlet conduit 104, incoming super-critical flow impacts on the banked up flow 121 forming once again a "hydraulic jump" in which the flow changes from super-critical to sub-critical flow with some loss of energy.

As flow 121 further increases, the "hydraulic jump" progresses downstream in conduit 104, into diversion/bypass chamber 102, over hump 109 and exits separator body 100 via outlet port and conduit 105 before dissipating and returning to super-critical flow in conduit 105.

At this, and greater, rates of flow in chamber 102 there is a tendency for the super-critical flow to scavenge liquid and captured matter from chamber 103 via diversion ports 128 so that the latter should be especially designed to prevent this occurring.

From observation of the impact of a jet of liquid on a flat plate inclined to the jet it is seen that the impacted jet forms a fan shape on moving up the screen. Thus the flow displays both longitudinal and lateral velocity components.

From a consideration of the principle of conservation of mass it can be shown that the velocity of the lateral flow components are identical to that of the impacting jet and to that of the flow component moving up the plate. From this it follows that as the velocity of the jet increases then so do the velocities of the component flows over the plate.

Further, as the inclination of the plate to the direction of travel of the jet is increased, the flow component up the plate decreases while the lateral flow components increase forming a more open fan shape.

This principle is employed in these embodiments of the invention when the supercritical flow impacts on the forward face of the hump 109. While most of the flow moves up the hump some moves laterally. As the diversion ports 128 are located adjacent to and on the forward face of the hump, as best seen in FIG. 16, the lateral flow components of the flow on the hump pass through the said ports and into chamber 103 thus preventing the occurrence of the aforesaid scavenging flow. The horizontal floors of the said diversion ports are level with floor 106 and extend into chamber 103. The horizontal roofs of the ports are above the level of the hump crest and parallel to the said floor while the enclosing sides are vertical so that the whole form short tunnels providing liquid communication between the said chambers. While the downstream sides are at right angles to the hump, the upstream sides may be inclined so that the tunnels may narrow towards their exits to chamber 103. The floating bodies 122 and heavier bodies 123 can be periodically removed by opening a lid 125 and pumping out the contents of separating/holding chamber 103.

In the second variation of this embodiment of the invention the baffle walls 113 and 114 and screens 118, 119 and 126 are omitted. Instead, two semi-circular baskets, constructed from perforated metal plate, are placed in separator/holding chamber 103 on either side of diversion/bypass chamber 102. Each basket is the same size in plan as the two semi-circular water surfaces of separator/holding chamber 103. The tops of the baskets extend up to the top of separator body 100 while the bottom of the baskets may rest on a floor 124. Thus when flow 121 enters the chamber through holes in the perforated plate matching the shape of diversion ports 128 and aligned with them, bodies 122 and 123 are retained in the baskets while flow 121 passes through the perforations in the diametrical side of the baskets, over weirs 110 and into diversion/bypass chamber 102 to pass out of the separator via outlet conduit 105.

To clean out the separator of this varied embodiment, a lid 125 is removed, the baskets are lifted out and bodies 122 and 123 emptied into a truck for transport and disposal. The baskets are then hosed down to clean off any attached materials and then lowered into chamber 103 and the lid 125 replaced.

Figure 20:
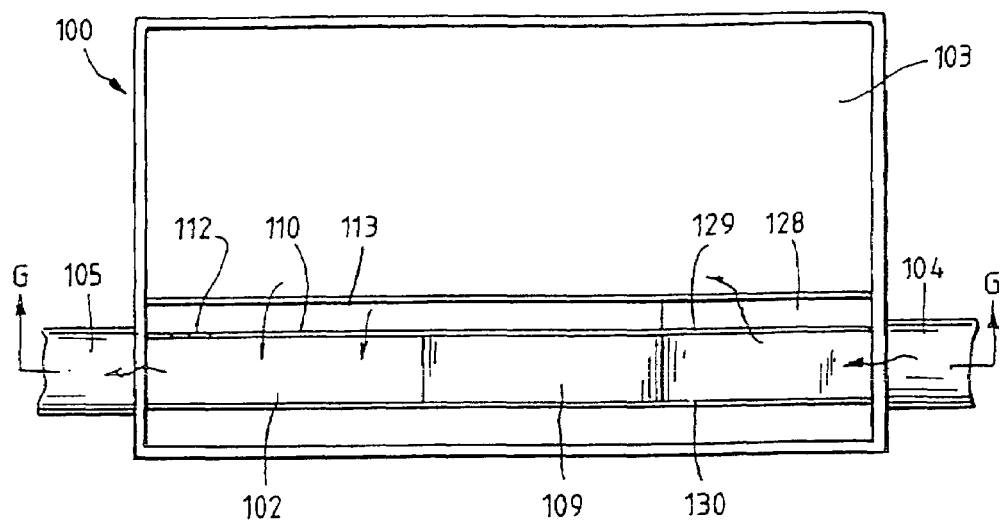
FIG. 20 is a schematic longitudinal cross-sectional side elevational view of a modified version of the embodiment of FIGS. 16 to 19.
Figure 21:
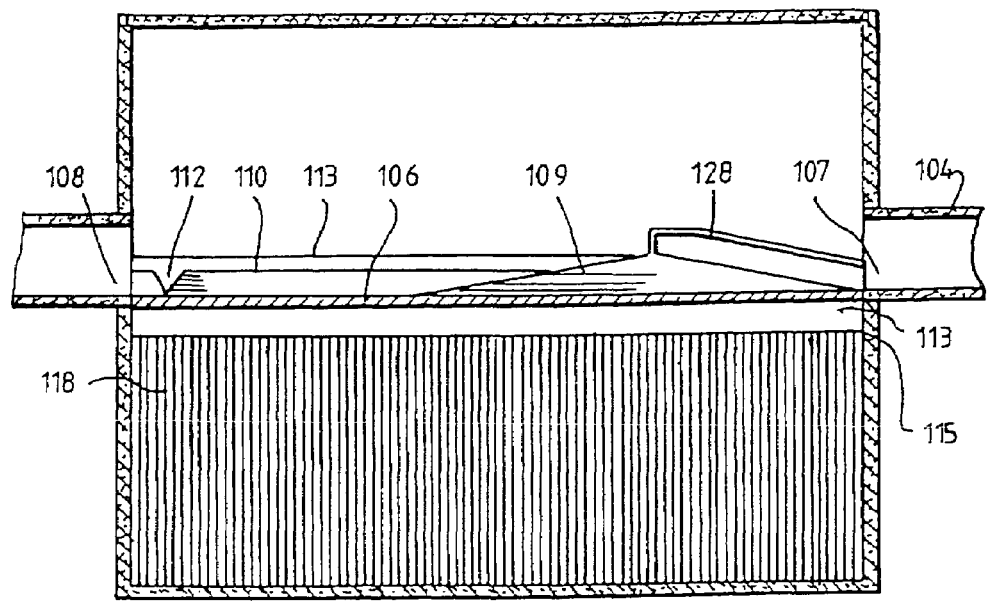
FIG. 21 is a schematic cross-sectional view taken along line G-G of FIG. 20.

In a further embodiment of the invention, shown in FIGS. 20 and 21, the inlet and outlet conduits are offset to one side of separator body 100 so that there is only one diversion port 128, weir 110, baffle 113 and full-depth screen 118 attached to baffle lower edge 115. The walls 129 and 130 of diversion/bypass chamber 102 extend from floor level 106 to the top 117 of the said separator body.

Diversion port 128 extends from wall 129 to baffle 113, and provides liquid communication between diversion/bypass chamber 102 and separator/holding chamber 103.

In a further variation of this embodiment of the invention, the weir 110 is located on the opposite side of chamber 102 to that described above. This confers the added advantage of distributing the flow more evenly through the vertical screen 118 since weir 110 is now further removed from the screen. In this variation the baffle 113 and the screen can now be adjacent to, or form part of, the sidewall 129 of chamber 102 while the conduits 104 and 105 must now be located some distance away from the wall of the body 100 to permit the flow to reach weir 110.

In an additional variation of this further embodiment and the further variation, the baffle wall 113 and screen 118 are omitted and a rectangular basket fabricated from perforated plate is placed in the separator holding chamber 103 and acts in the same manner as described above for the semi-circular baskets of the second variation of that embodiment.

The modes of operation of this variation of the embodiment of the invention are essentially the same that described in the preferred embodiment of FIGS. 16 to 19.

What is claimed is:

1. A separator for separating solids and other objects from a liquid, said separator comprising:
    a separator body through which the liquid, having debris entrained therein, flows from an inlet to an outlet,
    and means for diverting flow from the outlet during moderate flows whereby the solids and other objects entrained in the liquid is removed, and wherein the means for diverting the flow is an opening in the separator, the opening having two sides extending down to a downwardly extending curved wall containing a plurality of apertures therethrough, and wherein at low flow the liquid acquires potential energy that is converted to velocity energy as it falls by gravity through the opening and down the apertured wall to impact on the water surface in a lower chamber causing violent agitation against the said apertured wall, thus maintaining the apertures free of blockages by solid bodies.

2. The separator as claimed in claim 1, wherein the opening is in an internal floor of the separator.

3. The separator as claimed in claim 1, wherein the separator body includes an upstream conduit portion and a first chamber the floor of which is level with the bottom of the said conduit and said opening is located in said floor.

4. The separator as claimed in claim 3, wherein a portion of said floor is raised to form a hump adjacent to which the said opening is located.

5. The separator as claimed in claim 3, wherein the separator includes a second chamber located either laterally to, or on both sides of, the first chamber and also extending beneath it, said opening being between the first and second chambers.

6. The separator as claimed in claim 5, wherein the liquid level in the second chamber is kept below the floor level of the first chamber by means of a secondary conduit connected to the second chamber and to a conduit at a downstream point being at a lower level than an upstream conduit.

7. The separator as claimed in claim 6, wherein the secondary conduit is contained within the second chamber.

8. The separator as claimed in claim 5, wherein the second chamber contains the apertured wall interposed between the flow and the secondary conduit for deflecting the solids and other objects from the flow.

9. The separator as claimed in claim 5, wherein the floor of the second chamber is located below that of the first chamber so as to provide a holding area for heavier solids and other objects.

10. The separator as claimed in claim 5, wherein the liquid, together with the entrained bodies, is diverted to the second chamber via diversion ports in the walls of said first chamber.

11. The separator as claimed in claim 5, wherein the liquid level in the second chamber is kept above the floor level of the first chamber by means of one or more weirs.

12. The separator as claimed in claim 11, wherein said weirs have notches in them to accommodate lower liquid flow.

13. The separator as claimed in claim 11, wherein said weirs have crests that are lower than the crest of said hump.

14. The separator as claimed in claim 11, wherein said second chamber contains baffle plates parallel to the weirs but located laterally therefrom, and extend from the said hump to the outlet port, with the lower edges of the baffles being below the floor of the first chamber in order to retain floating solids and other objects.

15. The separator as claimed in claim 14, wherein said apertured wall is formed by one or more vertical screens attached to the lower edge of each baffle with, the or their, lower edges connected to a respective horizontal screen whereby to form one or more enclosures.

16. The separator as claimed in claim 15, wherein the, or each, said horizontal screen allows heavier solids and other objects that passes through the one or more vertical screens to pass through into the second chamber.

* * * * *